(12) United States Patent
Lee et al.

(10) Patent No.: US 7,031,890 B2
(45) Date of Patent: Apr. 18, 2006

(54) METHOD AND APPARATUS FOR ESTIMATING STATE PARAMETER IN NONLINEAR DISCRETE TIME SYSTEM

(75) Inventors: Jae-won Lee, Seoul (KR); Suk-han Lee, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 788 days.

(21) Appl. No.: 09/791,733

(22) Filed: Feb. 26, 2001

(65) Prior Publication Data

US 2001/0034589 A1    Oct. 25, 2001

(30) Foreign Application Priority Data

Feb. 24, 2000   (KR)   ................................. 2000-9105

(51) Int. Cl.
   *G06F 17/50*   (2006.01)

(52) U.S. Cl. .............................. 703/2; 700/29; 700/22; 700/38; 700/44; 706/14; 706/33; 708/300

(58) Field of Classification Search .................... 703/2; 702/2; 700/29, 33, 44, 38; 706/14, 33; 708/300
See application file for complete search history.

(56) References Cited

U.S. PATENT DOCUMENTS 5,627,768 A * 5/1997 Uhlmann et al. ........... 702/109
6,484,131 B1 * 11/2002 Amorai-Moriya et al. .. 702/189
6,502,061 B1 * 12/2002 Segawa ...................... 702/181

OTHER PUBLICATIONS

Julier et al, "A new extension of the Kalman filter to nonlinear systems", Proceedings of the 11th SPIE International Symposium on Aerospace/Defense Sensing, Simulation, and Controls, pp. 182-193, International Society for Optical Engineering, Apr. 1997.*
Maksarov et al, "State Bounding with Minimal Volume Ellipsoids", UKACC International Conference in CONTROL '96, Sep. 2-5, 1996.*
Welch et al., An Introduction to the Kalman Filter. TR 95-041, Dept. of Computer Science, U. of N.C. at Chapel Hill, Feb. 8, 2001, pp. 1-16.
Maybeck, Peter S., *Stochastic Models, Estimation, and Control*, Academic Press, New York, NY, 1979. vol. 1, Chap. 1, pp. 1-14.

* cited by examiner

*Primary Examiner*—W Thomson
*Assistant Examiner*—Tom Stevens
(74) *Attorney, Agent, or Firm*—Buchanan Ingersoll PC (57) ABSTRACT

A method and apparatus for estimating a state parameter in a nonlinear discrete time system are provided. The method for estimating a state parameter has the steps of (a) predicting a state parameter at a current time using an estimated state parameter at a previous time and a system dynamics; and (b) estimating an optimal state parameter at the current time from the state parameter predicted in the step (a) and a system output parameter measured at the current time, using a geometric data fusion method. Since the method and apparatus for estimating a state parameter have an excellent estimation performance particularly when nonlinearity is great or the error in an estimated initial value is big, the method and apparatus solve many problems, which cannot be solved by the conventional extended Kalman filter, and more improve the performance of estimating a state parameter, by analyzing the system characteristic and then appropriately utilizing constraints such as the operation range of the state parameter.

7 Claims, 5 Drawing Sheets

METHOD AND APPARATUS FOR ESTIMATING STATE PARAMETER IN NONLINEAR DISCRETE TIME SYSTEM

Priority is claimed to Republic of Korean Patent Application 00-9105 filed on Feb. 24, 2000, herein incorporated by reference.

BACKGROUND OF THE INVENTION

1. Field of the Invention

The present invention relates to state parameter estimation in a nonlinear system, and more particularly, to a method and apparatus for estimating a state parameter in a nonlinear discrete time system using a geometric data fusion method.

2. Description of the Related Art

To estimate a state parameter in a nonlinear system, an extended Kalman filter has been used as a representative technique. See, Peter S. Maybeck, "Stochastic Models, Estimation and Control, volume 1, chap. 1, pp. 1–14, Academic Press, N.Y., N.Y., 1979, and Welch and Bishop, "An Introduction to the Kalman Filter," TR 95-041, Dept. of Computer Science, U. of N.C. at Chapel Hill, Feb. 8, 2001, herein incorporated by reference. However, in a method using the extended Kalman filter, if the nonlinearity of a system is great or an initial estimation error is big, the result of a state parameter estimation diverges, and even when the result does not diverge, the estimation performance is not so good.

Also, when the characteristic of a system became known, for example, when the operation range of a state parameter or an output parameter became known, the conventional methods cannot effectively utilize this characteristic of the system to improve the performance of a state parameter estimation.

SUMMARY OF THE INVENTION

An object of the present invention to provide a method and apparatus for estimating a state parameter in a nonlinear discrete system in which the state parameter estimation performance is improved by predicting a current state parameter and using a geometric data fusion method for the predicted result, and further improved by appropriately using the known characteristic of the system as a constraint.

To accomplish the above object of the present invention, there is provided a method for estimating a state parameter, which shows the characteristic of a system, in a nonlinear discrete time system, the method having the steps of (a) predicting a state parameter at a current time using an estimated state parameter at a previous time and a system dynamics; and (b) estimating an optimal state parameter at the current time from the state parameter predicted in the step (a) and a system output parameter measured at the current time, using a geometric data fusion method.

Also provided is a device for estimating a state parameter, showing the characteristic of a nonlinear discrete time system, the device including a forward transition unit for predicting a state parameter at the current time using an estimated state parameter at the previous time and a system dynamics; and a backward transition unit for estimating the optimal state parameter at the current time from the state parameter predicted in the forward transition unit and an output parameter measured at the current time, using a geometric data fusion method.

BRIEF DESCRIPTION OF THE DRAWINGS

The additional features and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
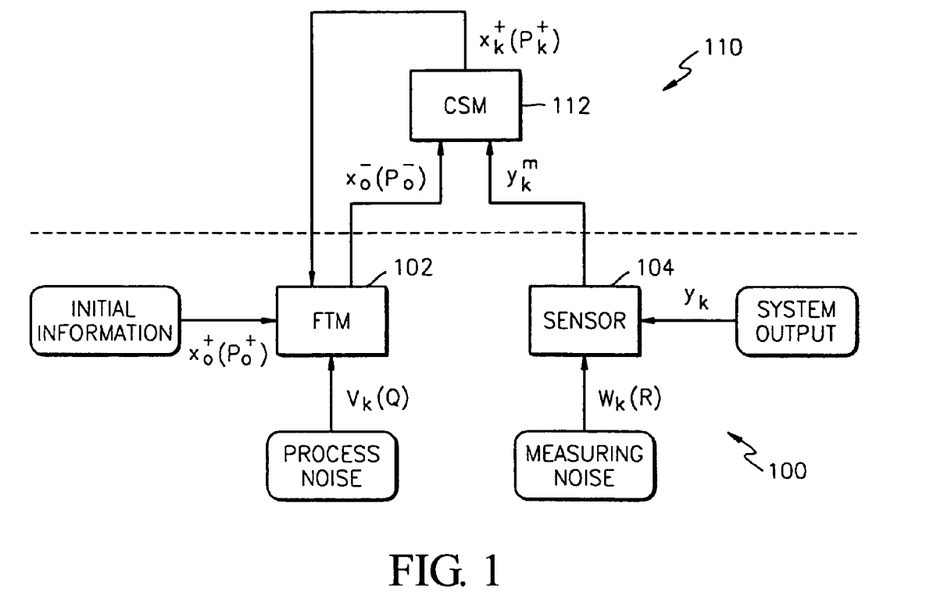
FIG. 1 is a block diagram for explaining an apparatus for estimating a state parameter according to the present invention.

FIG. 1 is a block diagram for explaining an apparatus for estimating a state parameter according to the present invention.

An apparatus for estimating a state parameter according to the present invention has a forward transition module 100 and a backward transition module 110. More specifically, the forward transition module 100 has a feature transformation module (FTM) 102 and a sensor 104, and the backward transition module 110 has a constraint satisfaction module (CSM) 112.

It will be understood that the forward transition module 100 and the backward transition module 110 can be in the form of a general purpose computer, application specific integrated circuit or a digital signal processor with hardware, software and firmware implementations of the functionality of the present invention. The sensor 104 can be any of a number of known sensors which are capable of measuring a parameter of a system. Further, the initial information process noise can be input through any of a variety of input devices, including keypads, download functions from other sources, mouse or any other suitable device capable of inputting the information into a general purpose computer, for example.

The present invention has applications in such diverse technologies as intelligent vehicle systems, mobile robots, navigation systems, global positioning systems, autopilot systems, and target tracking systems for missiles, aircraft, etc.

In essence, the present invention provides a model which adequately represents aspects of behavior of a physical system such as aircraft, chemical processes, or even a national economy. The present invention enables the development of control theories. In this regard, the measurement devices are constructed to output data signals which are proportional to certain variables of interest. These output signals and the known inputs to the system are directly discernible information based on system behavior. Hence, the present invention provides useful, concrete and tangible results in the form of a control system which relates a state parameter estimation and in particular a non-linear discrete time system using a geometric data fusion method.

Generally, a nonlinear discrete time system is a system generating a nonlinear output with respect to an input for a discrete time, and has a state parameter indicating the characteristic of the system as well as an input parameter, and an output parameter. The present invention provides a perception-net shown in FIG. 1 to estimate a state parameter. The perception-net means a block diagram showing various modules for signal processing and sensing/data fusion, and related flows of various data and parameters. The perception-net according to the present invention has a forward transition function and a backward transition function to improve the reliability of data.

Figure 2:
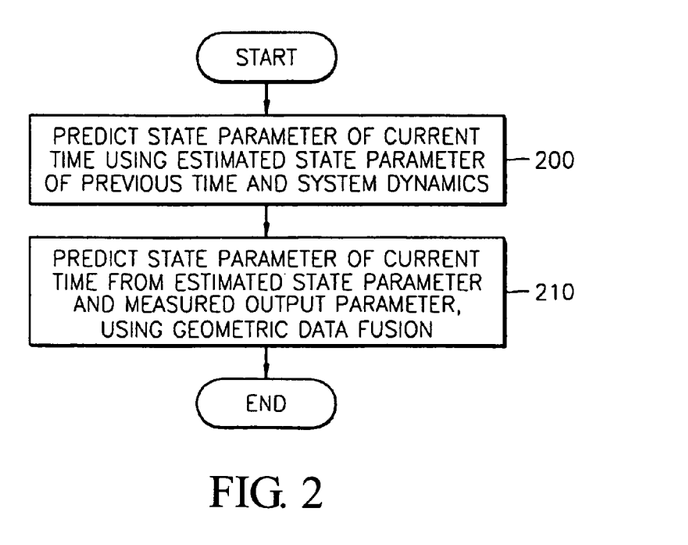
FIG. 2 is a flowchart for explaining a method for estimating a state parameter according to the present invention.

FIG. 2 is a flowchart for explaining a method for estimating a state parameter according to the present invention. Referring to FIG. 2, the operation of the apparatus for estimating a state parameter shown in FIG. 1 will now be explained.

First, in the perception-net for estimating a state parameter proposed in the present invention, the forward transition module 100 predicts a state parameter at the current time, using the estimated state parameter at the previous time and system dynamics in step 200.

If expressed in a numerical formula, the state parameter ($x_k$) at the current time is $x_k = f_{k-1}(x_{k-1}, v_{k-1})$. Here, k indicates the current time in discrete times k−1 indicates the previous time, $v_{k-1}$ indicates a process noise, the f function indicates the system dynamics expressed in a numerical formula.

In the state parameter estimating apparatus, the FTM 102 predicts a state parameter at the current time via an estimated state parameter at a previous time and the system dynamics, and at this time, also predicts an error covariance matrix with respect to the state parameter at the current time. The sensor 104 measures the system output at the current time. If the system output ($y_k$) is $y_k = h_k(x_k)$, the system output ($y_k^m$) measured by the sensor 104 is $y_k^m = y_k + w_k$. Here, $w_k$ indicates a measured noise in the sensor.

Next, using a geometric data fusion method, the backward transition module 110 estimates the optimal state parameter at the current time from the state parameter predictions through the state parameter estimating apparatus and the measured system output at the current time in step 210.

Also, in the forward and/or backward transition modules 100 and/or 110, the error covariance of the state parameter as well as the state parameter are modeled and propagated into an ellipsoidal uncertainty region. The state parameter at the current time estimated through the backward transition module 110 and the error covariance thereof are used for predicting a state parameter the next time (step).

Also, the backward transition module 110 improves the reliability of estimated data, together with the system constraint. Using the geometric data fusion method, the CSM 112 estimates the optimal state parameter satisfying the system constraint.

The system constraint used in the present invention is that the predicted output parameter ($y_k$) obtained from the state parameter ($x_k$), which is predicted through the FTM 102, through the output parameter equation $y_k = h_k(x_k)$ should be the same as the output parameter ($y_k^m$) measured through the sensor 104. Since various noises in the system and an initial estimation error exist, two parameters may be different from each other. However, as described above, using the geometric data fusion method, an estimated optimal state parameter is obtained, considering the covariance or uncertainty region of each parameter Here, the geometric data fusion method used in the present invention will now be explained briefly in theory.

Assumed that two parameters x and y to be estimated exist, the current values measured by the sensor that measures each parameter are $x_m$ and $y_m$, respectively, and the error covariance matrices of the parameters are $P_x$ and $P_y$, respectively. Here, it is assumed that an uncertainty region is expressed in an ellipse, based on the error covariance matrix of each parameter for the geometric data fusion, as the following equation 1:

$$(x-x_m)'W_x(x-x_m) \leq 1$$

$$(y-y_m)'W_y(y-y_m) \leq 1 \quad (1)$$

Here, it is defined that $w_x = (p_x)^{-1}$, $w_y = (p_y)^{-1}$. Also, it is assumed that two parameters satisfy an equality constraint $f_c(x,y) = c$ and en inequality constraint $g_c(x,y) \leq 0$ as system constraints. At this time, for the geometric data fusion method satisfying these constraints and considering the uncertainty region, an optimization model is considered as the following equation 2:

$$\underset{x,y}{\text{Minimize}}\left[\|x - x_m\|_{w_2}^2 + \|y - y_m\|_{w_y}^2\right]$$

subject to $f_c(x,y) = 0$ and $g_c(x,y) \leq 0$ (2)

Figure 3:
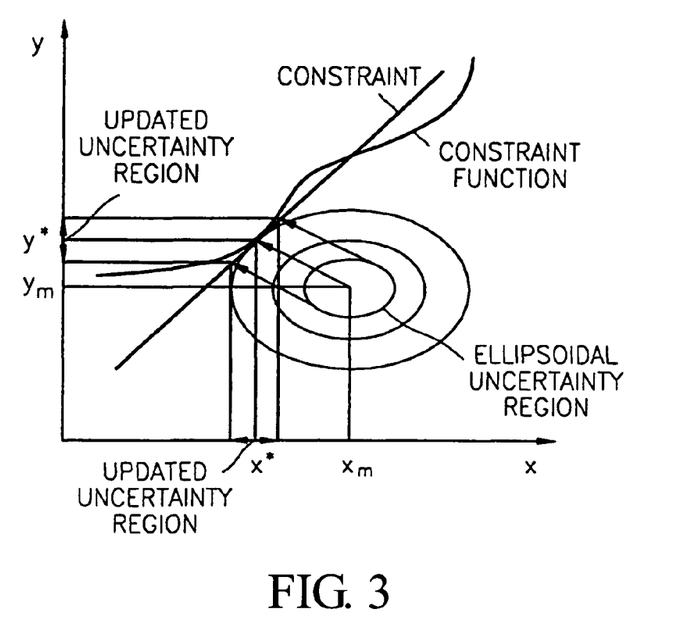
FIG. 3 is a diagram for explaining a geometric fusion method used in the present invention.

The physical meaning of this optimization model is as shown in FIG. 3. In obtaining new estimated values for x and y from the estimated current values, $x_m$, and $y_m$, of the parameters, the ellipsoidal uncertainty regions of two parameters are considered. A new ellipsoidal region centering on the estimated current value of each parameter is defined, and with this ellipsoidal shape being maintained, the minimum-size ellipsoidal region satisfying the system constraint is obtained from the estimated current values of the two parameters.

A newly estimated value from the estimated current value is defined as an optimal solution ($x^*,y^*$) of the above optimization model. The uncertainty region related to and surrounding the estimated current value is obtained by projecting the uncertainty region to the plane linearized at the optimal solution location. The linearized plane, that is, the tangent line at the location where the optimal solution ($x^*,y^*$) crosses the constraint $f_c(x,y) = c$, and the projected ellipsoidal uncertainty region are defined as the following equation 3:

$$X'x + Y'y = 0, \text{ where } X' = \frac{\partial f_c}{\partial x}\bigg|_{x=x^*}, Y' = \frac{\partial f_c}{\partial x_c}\bigg|_{y=y^*} \quad (3)$$

$$W_{x^*} = W_{x_m} + XY^{-1}W_{y_m}Y^{-1}X'$$

$$W_{y^*} = W_{y_m} + YX^{-1}W_{x_m}X^{-1}Y'$$

Now, a method for estimating a state parameter in a nonlinear discrete time system by the perception-net according to the present invention will now be explained in detail.

First, the state parameter at the current time is predicted through the FTM 102 of the forward transition module 100, using the estimated state parameter at the previous time and the system dynamics. The estimating equation is the following equation 4:

$$x_k^- = f_{k-1}(x_{k-1}^+, 0) \quad (4)$$

Here, $x_k^-$ indicates the predicted state parameter, and $x_{k-1}^+$ indicates the estimated state parameter at the previous time. At this time, the error covariance matrix, which is predicted together with the state parameter at the current time, is propagated in accordance with equation 5:

$$P_k^- = F_{k-1}P_{k-1}^+ F_{k-1}' + Q_{k-1} \quad (5)$$

$$F_{k-1} = \frac{\partial f_{k-1}}{\partial x}\bigg|_{x=x_{k-1}^+}$$

$$P_k^- = E\{(x_k - x_k^-)(x_k - x_k^-)'\}$$

$$P_{k-1}^+ = E\{(x_k - x_{k-1}^+)(x_k - x_{k-1}^+)'\}$$

$$Q_{k-1} = E\{w_{k-1}w_{k-1}'\}$$

Next, the state parameter at the current time is estimated through the CSM 112 of the backward transition module 110, using the predicted state parameter from the equation 4 and the output parameter measured at the current time. Here, the geometric data fusion method as described above is used and a system constraint that the predicted output parameter obtained from the predicted state parameter should be the same as the output parameter measured at the current time is set. Also, various other system constraints, such as setting a threshold, can be added.

Therefore, the optimization model required in the geometric data fusion method is defined as the following equation 6:

$$\underset{x,y}{\text{Minimize}}\left[\|x - x_k^-\|_{(P_k^-)^{-1}}^2 + \|y - y_k^m\|_{R^{-1}}^2\right] \quad (6)$$

subject to $y = h_k(x)$

Here, R is the covariance matrix of the noise of the sensor itself. The solution of this optimization model is the estimated state parameter at the current time, and the corresponding error covariance matrix is obtained by the following equation 7:

$$W_k^+ = W_k^- + H_k'R^{-1}H_k \quad (7)$$

Figure 4:
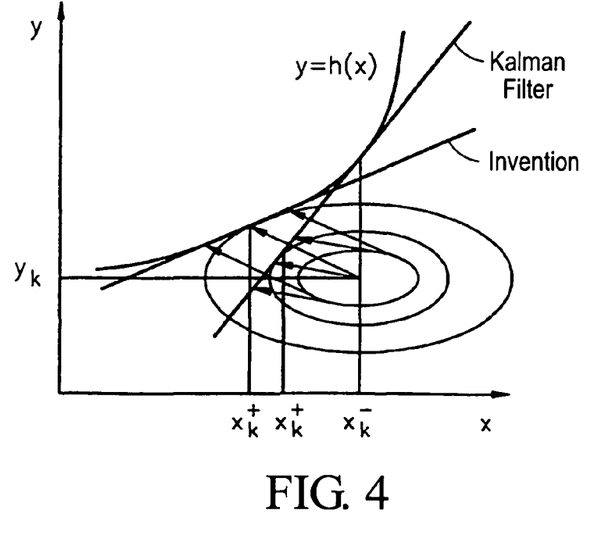
FIG. 4 is a diagram for comparing a state parameter estimating method according to the present invention to the conventional extended Kalman filter.

-continued where $W_k^+ = (P_k^+)^{-1}$, $W_k^- = (P_k^-)^{-1}$ and $H_k = \frac{\partial h_k}{\partial x}\bigg|_{x=x_k^+}$ FIG. 4 is a diagram for comparing a state parameter estimating method according to the present invention to the conventional extended Kalman filter. Referring to FIG. 4, the optimal solution of the present invention is tangential to the system characteristic curve with respect to the output parameter equation y=h(x), which is the system constraint, while the solution of the conventional extended Kalman filter is not tangential to the system characteristic curve with a great error. Also, the ellipsoidal uncertainty region showing the error covariance matrix of the present invention is projected so that the tangent line to the system characteristic curve is tangential to the ellipsoidal uncertainty region maintaining the ellipsoidal shape.

Also, a method for estimating a state parameter in a linear system by the perception-net according to the present invention will now be explained.

If the system output parameter equation is linear, the solution of the optimization model can be better obtained than that in the nonlinear system. If the output parameter equation is linear, the equation is expressed as $y_k = h_k(x_k) = Cx_k$. At this time, a needed optimization model is defined as the following equation 8:

$$\underset{x,y}{\text{Minimize}}\left[\|x - x_k^-\|_{(P_k^-)^{-1}}^2 + \|Cx - y_k^m\|_{R^{-1}}^2\right] \quad (8)$$

The solution of this optimization model and the corresponding error covariance matrix can be obtained by the following equation 9:

$$x_k^+ = ((P_k^+)^{-1} + C'R^{-1}C)^{-1}((P_k^-)^{-1}x_k^- + C'R^{-1}y_k) \quad (9)$$

$$P_k^+ = ((P_k^-)^{-1} + C'R^{-1}C)^{-1}$$

For reference, a simulation was carried out to compare the estimation performance of the present invention and that of the conventional method.

First, a discrete time system having the following nonlinear output equation is taken as an example.

$$x_{k+1} = \begin{bmatrix} 1 & 0.1 \\ -0.1 & 0.9 \end{bmatrix} x_k + w_k$$

$$y_k = h(x_k) + v_k$$

In the simulation, two cases of h(x) and the estimated initial values in the two cases are considered and it is assumed that no noise exists for a clear comparison. As the first experiment example, it is defined that:

$h(x)=h(x_1)=x(1)^2+x(1)+x(2)$ and $x_0=[1-3]'$ or $x_0=[5-5]'$.

Here, x(1) indicates a first element of $x_0$, and x(2) indicates a second element of $x_0$.

As the second experiment example, it is defined that:

$$h(x) = h_1(x) = [1/2(x(1)+1)^2 + x(2)^2) 1/2(x(1)+1)^2 + x(2)^2)]'$$
$$\text{and } x_0 = [\,0.5 \;\; -0.5\,]' \quad \text{or} \quad x_0 = [\,3 \;\; -5\,]'$$

Figure 5A:
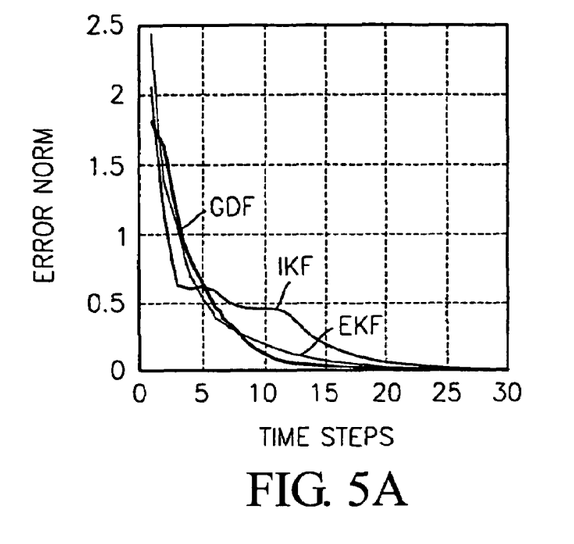
FIGS. 5A and 5B are diagrams for comparing the estimation performance of the present invention to that of the conventional method in the first experiment example in a nonlinear discrete time system.
Figure 5B:
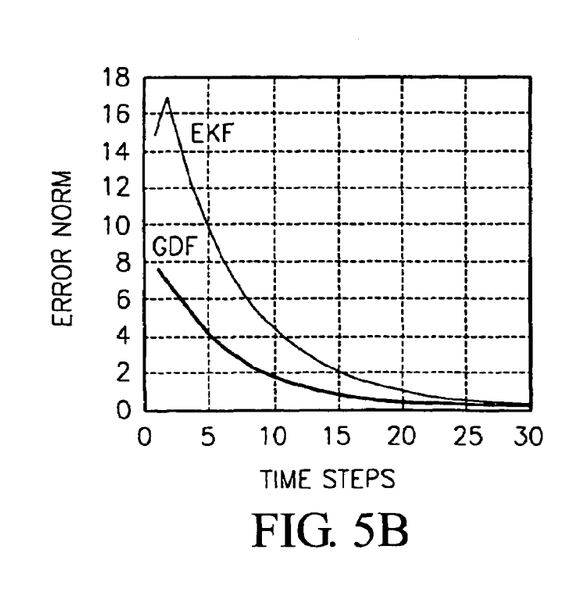

To compare the estimation performance of the present invention, both the extended Kalman filter (EKF) and the iterated Kalman filter (IKF), the leading conventional estimating filters, are applied. Referring to FIG. 5A, in the first experiment example which has less nonlinearity, when the error of the estimated initial value is smaller $$(x_0 = [\,1 \;\; -3\,]'),$$

the performance of the estimating filter according to the present invention (geometric data filter, GDF) shows a little better result than that of the conventional estimating filters. Next, referring to FIG. 5B, when the error of the estimated initial value is greater $$(x_0 = [\,5 \;\; -5\,]')$$

in the first experiment example, the conventional IKF diverged, and the performance difference between the GDF of the present invention and the conventional EKF became much greater.

Figure 6A:
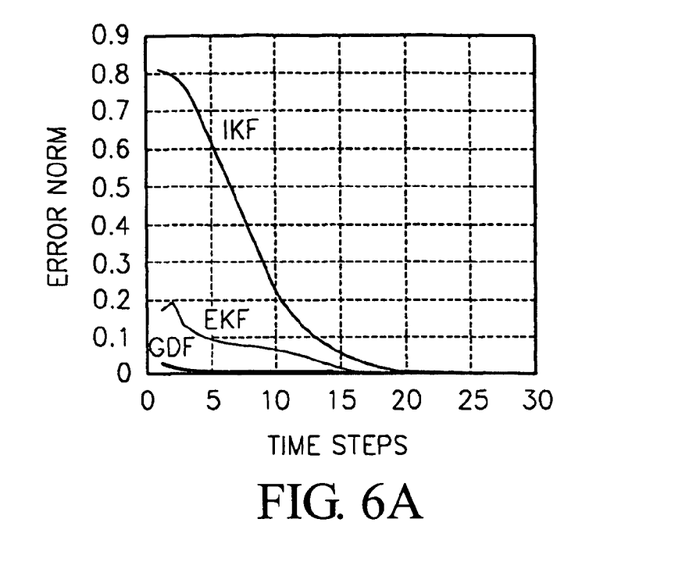
FIGS. 6A and 6B are diagrams for comparing the estimation performance of the present invention to that of the conventional method in the second experiment example in a nonlinear discrete time system.
Figure 6B:
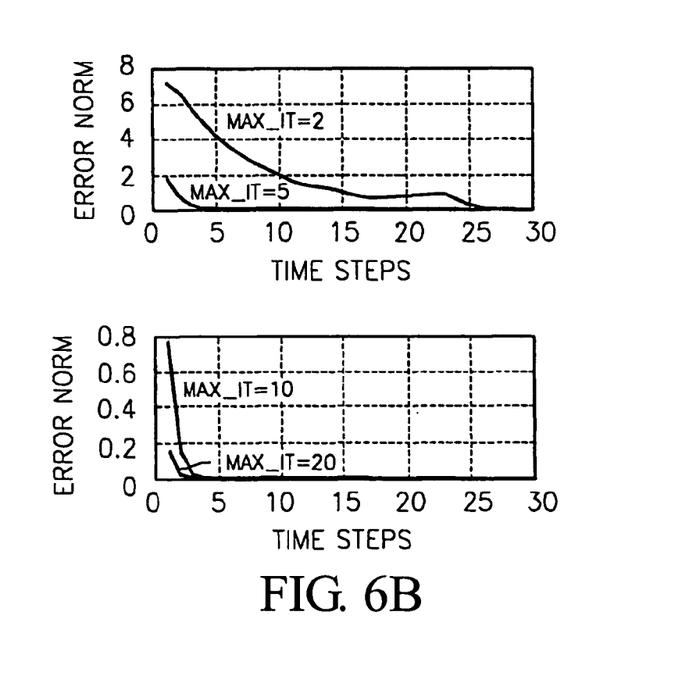

FIGS. 6A and 6B are diagrams for comparing the estimation performance of the present invention and that of the conventional method in the second experiment example in a nonlinear discrete time system.

Referring to FIG. 6A, in the second experiment example which has more nonlinearity, when the error of the estimated initial value is smaller $$(x_0 = [\,0.5 \;\; -0.5\,]'),$$

the performance of the GDF of the present invention also shows the best result. Also, referring to FIG. 6B, when the error of the estimated initial value is greater $$(x_0 = [\,3 \;\; -5\,]')$$

in the second experiment example, the conventional estimating filters (EKF, IKF) all diverged, and the estimating filter of the present invention showed a stable performance. In addition, in the process for obtaining the optimal solution, the performance became much better as the maximum iteration (max_it) was raised.

Next, an experiment example, in which the estimation performance can be enhanced by using the knowledge on a system as a constraint, will be explained. The example is a discrete time system having the following linear output equation:

$$x_{k+1} = \begin{bmatrix} 0.9950 & 0.0998 \\ -0.0998 & 0.9950 \end{bmatrix} x_k + w_k$$
$$y_k = Cx_k + v_k$$

In this system, poles of the system are all on one circle. That is, if an external noise or disturbance does not exist, the state parameter is vibrating within a range determined by the initial value. Therefore, this knowledge can be regarded as a constraint. First, though the accurate value of the initial value is not known, it is assumed that the initial value is in a known range as follows:

$$x_0^{low} \leq x_0 \leq x_0^{up}$$

Based on this information, the operation range of the state parameter in the system is obtained from the following equation:

$$-x^{lim} \leq x_k \leq x^{lim}$$

where $$x^{lim} = \|x_0^{lim}\| \begin{bmatrix} 1 \\ 1 \end{bmatrix} \text{ and } x_0^{lim}(i) = \max\{x_0^{up}(i), -x_0^{low}(i)\}$$

The parameters values used in the simulation are:

$$x_0 = [\,10 \;\; -10\,]' \text{ and } x_0^{up} = -x_0^{low} = [\,10 \;\; 10\,]'.$$

The first experiment example is C=[1 1] and the second experiment example is C=[1 −1], and it is assumed that the estimated initial values are as follows:

$$x_0^+ = [0, 0]', \; P_0^+ = p_0 \begin{bmatrix} 1 & 0 \\ 0 & 1 \end{bmatrix}$$

where $p_0 = 1$ or $100$

Figure 7A:
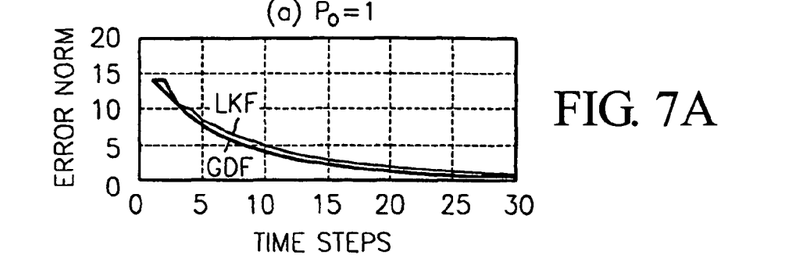
FIGS. 7A and 7B are diagrams for comparing the estimation performance of the present invention to that of the conventional method in the first experiment example in a linear discrete time system using constraints.
Figure 7B:
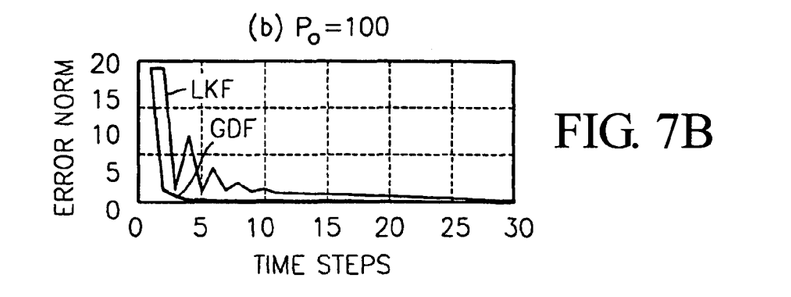

FIGS. 7A and 7B are diagrams for comparing the estimation performance of the present invention and that of the conventional method in the first experiment example in a linear discrete time system using constraints. Referring to FIGS. 7A and 7B, in case of C=[1 1], the conventional linear Kalman filter (LKF) showed a great difference in performance with respect to the estimated initial value of covariance ($P_0$), while the estimating filter (GDF) of the present invention showed stable performances regardless of the initial assumption.

Figure 8A:
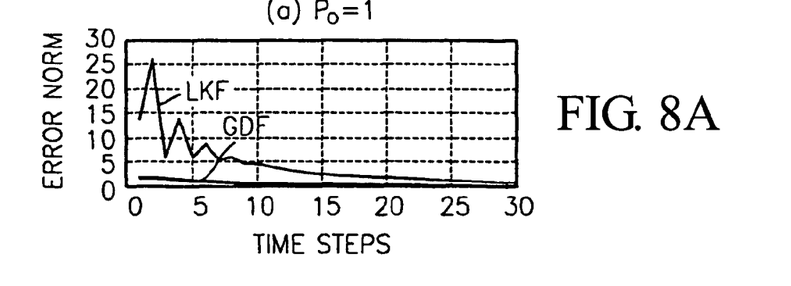
FIGS. 8A and 8B are diagrams for comparing the estimation performance of the present invention to that of the conventional method in the second experiment example in a linear discrete time system using constraints.
Figure 8B:
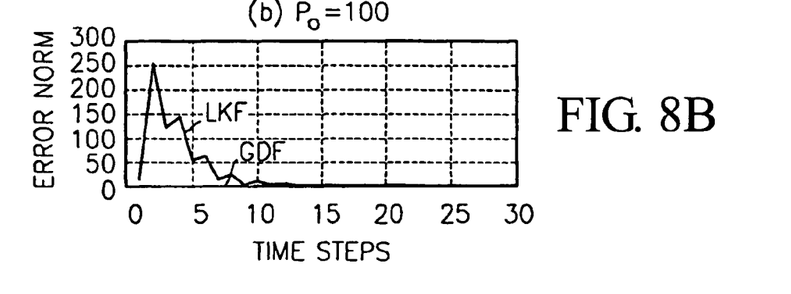

FIGS. 8A and 8B are diagrams for comparing the estimation performance of the present invention and that of the conventional method in the second experiment example in a linear discrete time system using constraints. Also, in case of C=[1 −1], the conventional LKF showed poor performances, while the GDF of the present invention continuously showed good performances.

As described above, since the method and apparatus for estimating a state parameter in a nonlinear discrete time system according to the present invention has an excellent estimation performance particularly when nonlinearity is great or the error in an estimated initial value is big, the method and apparatus of the present invention solve many problems, which cannot be solved by the conventional extended Kalman filter, and more improve the performance of estimating a state parameter, by analyzing the system characteristic and then appropriately utilizing constraints such as the operation range of the state parameter.

What is claimed is:

1. A method for estimating a state parameter, which shows the characteristic of a system, in a nonlinear discrete time system, the method comprising executing the following steps in a processing device:
   (a) predicting a state parameter at a current time using an estimated state parameter at a previous time and system dynamics; and
   (b) estimating an optimal state parameter at the current time from the state parameter predicted in step (a) and a useful, concrete and tangible system output parameter measured at the current time, using a geometric data fusion method, wherein a minimized ellipsoidal region satisfying a system constraint is obtained, and wherein said method provides a useful, concrete and tangible result in the form of a nonlinear discrete time system using said geometric data fusion method.

2. The method of claim 1, wherein step (b) is conducted by estimating the optimal state parameter by the geometric data fusion method in such a manner to satisfy system constraints, and the system constraints being whether a predicated system output parameter obtained from the predicted state parameter is identical to a measured system output parameter.

3. The method of claim 2, wherein an optimization model satisfying the system constraints and needed in the geometric data fusion method is defined as the following:

$$\underset{x,y}{\text{Minimize}}\left[\|x - x_k^-\|^2_{(P_k^-)^{-1}} + \|y - y_k^m\|^2_{R^{-1}}\right]$$

Subject to $y = h_k(x)$ where $x_k^-$ indicates the predicted state parameter at the current time, $y_k^m$ indicates the predicted system output parameter, $P_k^-$ indicates an error covariance matrix with respect to the state parameter at the current time, and R indicates a covariance matrix of a measured noise, a solution of the optimization model being the estimated state parameter at the current time, to be obtained in the step (b).

4. A device for estimating a state parameter, showing the characteristic of a nonlinear discrete time system, the device comprising:
   a forward transition unit for predicting a state parameter at the current time using an estimated state parameter at the previous time and a system dynamics; and
   a backward transition unit for estimating the optimal state parameter at the current time from the state parameter predicted in the forward transition unit and a useful, concrete and tangible output parameter measured at the current time, using a geometric data fusion method, wherein a minimized ellipsoidal region satisfying a system constraint is obtained.

5. The device of claim 4, wherein the forward transition unit includes:
   a feature transformation unit for predicting the state parameter at the current time through the estimated state parameter at the previous state and the system dynamics, and predicting a corresponding error covariance matrix; and
   a sensor for measuring an output parameter at the current time.

6. The device of claim 4, wherein the backward transition unit includes:
   a constraint unit for estimating the optimal state parameter at the current time satisfying system constraints, while using the geometric data fusion method.

7. The device of claim 6, wherein the system constraints being in such a manner that the predicted system output parameter obtained from the predicted state parameter is identical to the measured system output parameter.

* * * * *